(12) United States Patent
Tsuruta et al.

(10) Patent No.: US 7,604,677 B2
(45) Date of Patent: Oct. 20, 2009

(54) STRUCTURE OF AIR CLEANER BOX

(75) Inventors: Yuichiro Tsuruta, Saitama (JP); Toru Iwadate, Saitama (JP); Yoshiaki Noda, Saitama (JP); Taeko Togawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 456 days.

(21) Appl. No.: 11/392,700

(22) Filed: Mar. 30, 2006

(65) Prior Publication Data
US 2006/0230728 A1 Oct. 19, 2006

(30) Foreign Application Priority Data
Mar. 31, 2005 (JP) .............................. 2005-102503

(51) Int. Cl.
 *B01D 50/00* (2006.01)
 *B01D 59/50* (2006.01)
 *B01D 46/42* (2006.01)
(52) U.S. Cl. .................. 55/385.3; 55/493; 55/498; 55/503; 55/504; 55/510; 55/484; 55/417; 55/DIG. 28; 55/DIG. 30; 123/198 E; 60/282; 60/304; 180/313
(58) Field of Classification Search .................. 55/385.3, 55/493, 498, 503, 504, 510, 484, 417, DIG. 28, 55/DIG. 30; 123/198 E; 60/282, 304; 180/313

See application file for complete search history.

(56) References Cited

U.S. PATENT DOCUMENTS

| 6,287,354 | B1 * | 9/2001 | Nozaki ...................... 55/385.3 |
| 6,716,264 | B2 * | 4/2004 | Onoda ........................ 55/385.3 |
| 7,122,067 | B2 * | 10/2006 | Prellwitz et al. ............ 55/385.3 |
| 7,361,201 | B2 * | 4/2008 | Nakagome et al. .......... 55/385.3 |
| 2004/0128963 | A1 * | 7/2004 | Tsuruta et al. ............. 55/385.3 |

FOREIGN PATENT DOCUMENTS

JP 2004-124762 A 4/2004

* cited by examiner

*Primary Examiner*—Duane Smith
*Assistant Examiner*—Minh-Chau T Pham
(74) *Attorney, Agent, or Firm*—Birch, Stewart, Kolasch & Birch, LLP

(57) ABSTRACT

An air cleaner box structured to facilitate the attaching and detaching operation of an air cleaner element While enhancing the support rigidity thereof. The air cleaner box includes a casing having a case body and the openable and closable case cover. The air cleaner element and the element holder to support the air cleaner element are contained in the casing. The element holder has an extended U-shape in cross section, and has end sections that are supported by the case body and the case cover respectively. The element holder pivots on the bottom face rear ends of the holder lower protrusions in an inclinable manner.

18 Claims, 10 Drawing Sheets

STRUCTURE OF AIR CLEANER BOX

CROSS-REFERENCE TO RELATED APPLICATION

The present application claims priority under 35 U.S.C. §119 to Japanese Patent Application No. 2005-102503, filed Mar. 31, 2005, the entire contents of which are hereby incorporated by reference.

BACKGROUND OF THE INVENTION

1. Field of the Invention

The present invention relates to a structure of an air cleaner box used for the filtration or the like of inlet air to an engine of a vehicle.

2. Description of Background Art

One example of a conventional air cleaner box is configured to contain an air cleaner element in the casing thereof; to support one end section of the air cleaner element by engaging it with a support of the casing; and to support the other end section thereof with rib sections extending from the casing in order to restrain the one end section from detaching from the support (See, for example, JP-A No. 124762/2004)

Meanwhile, in such a conventional configuration as stated above, it is desirable to wholly support the other end section in order to enhance the support rigidity of an air cleaner element. However, it is not recommendable to extend or add the rib sections for that purpose since the measure affects the attaching and detaching operation of the air cleaner element in some cases.

SUMMARY AND OBJECTS OF THE INVENTION

In view of the above situation, the present invention provides a structure of an air cleaner box capable of facilitating the attaching and detaching operation of an air cleaner element while enhancing the support rigidity thereof.

According to a first aspect of the present invention, an air cleaner box (for example, the air cleaner box 18 in the embodiment) is configured to contain an air cleaner element (for example, the air cleaner element 101 in the embodiment) in a casing (for example, the casing 81 in the embodiment). The casing includes a case body (for example, the case body 82 in the embodiment) and an openable and closable case cover (for example, the case cover 83 in the embodiment). An air cleaner element and an element holder (for example, the element holder 121 in the embodiment) to support the air cleaner element are contained in the casing. The element holder has an extended U-shape in cross section; both the end sections thereof are supported by the case body and the case cover respectively; and the element holder pivots on one end section thereof (for example, the bottom face rear ends 126b of the holder lower protrusions 126 in the embodiment) in an inclinable manner.

With this configuration, by supporting both the end sections of the element holder having an extended U-shape in cross section, it is possible to surely hold the air cleaner element through the element holder without extending or adding the rib sections extending from the casing. At the time of the attaching or detaching operation thereof, to incline the element holder and retract it from the element support position; and hence to facilitate the attaching or detaching operation thereof while enhancing the support rigidity of the air cleaner element.

According to a second aspect of the present invention, the element holder has a lock flange (for example, the lock flange 124 in the embodiment) to engage with the air cleaner element. With this configuration, it is possible to surely support the air cleaner element with the element holder while ensuring the relative positioning of the air cleaner element and the element holder.

According to a third aspect of the present invention, the element holder is supported by rib sections (for example, the rib sections 117 and 118 in the embodiment) extending from the case body and the case cover. With this configuration, it is possible to reduce the extension length of each rib section in comparison with the case of directly supporting the air cleaner element with rib sections.

According to a fourth aspect of the present invention each of the rib sections is formed by intersecting two sheets of ribs (for example, a sheet of the longitudinal ribs 117a and 118a and a relevant sheet of the lateral ribs 117b and 118b in the embodiment) in a cross shape. With this configuration, it is possible to stably support the element holder with a simple structure.

According to a fifth aspect of the present invention, the intersection (for example, the intersection 117c in the embodiment) of the ribs of each of the rib sections functions as the pivot of the inclination of the element holder. With this configuration, it is possible: to properly notch each of the ribs intersecting in a cross shape and engage the rib with one end section of the element holder; and thus to easily form the inclination pivot of the element holder without using a specific structure.

According to the first aspect of the present invention, it is possible to facilitate the attaching and detaching operation of the air cleaner element while enhancing the support rigidity thereof.

According to the second aspect of the present invention, it is possible to surely support the air cleaner element with the element holder.

According to the third aspect of the present invention, it is possible to reduce the extension length of each rib section.

According to the fourth aspect of the present invention, it is possible to stably support the element holder with a simple structure.

According to the fifth aspect of the present invention, it is possible to easily form the inclination pivot of the element holder without using a specific structure.

Further scope of applicability of the present invention will become apparent from the detailed description given hereinafter. However, it should be understood that the detailed description and specific examples, while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Here, in the explanations below, it is assumed that the directions of front, rear, right and left are identical to the directions related to the traveling direction of a vehicle unless otherwise specified. Further, the arrow FR in the figures shows the front direction of the vehicle, the arrow LH the left direction thereof, and the arrow UP the upper direction thereof, respectively.

Figure 1:
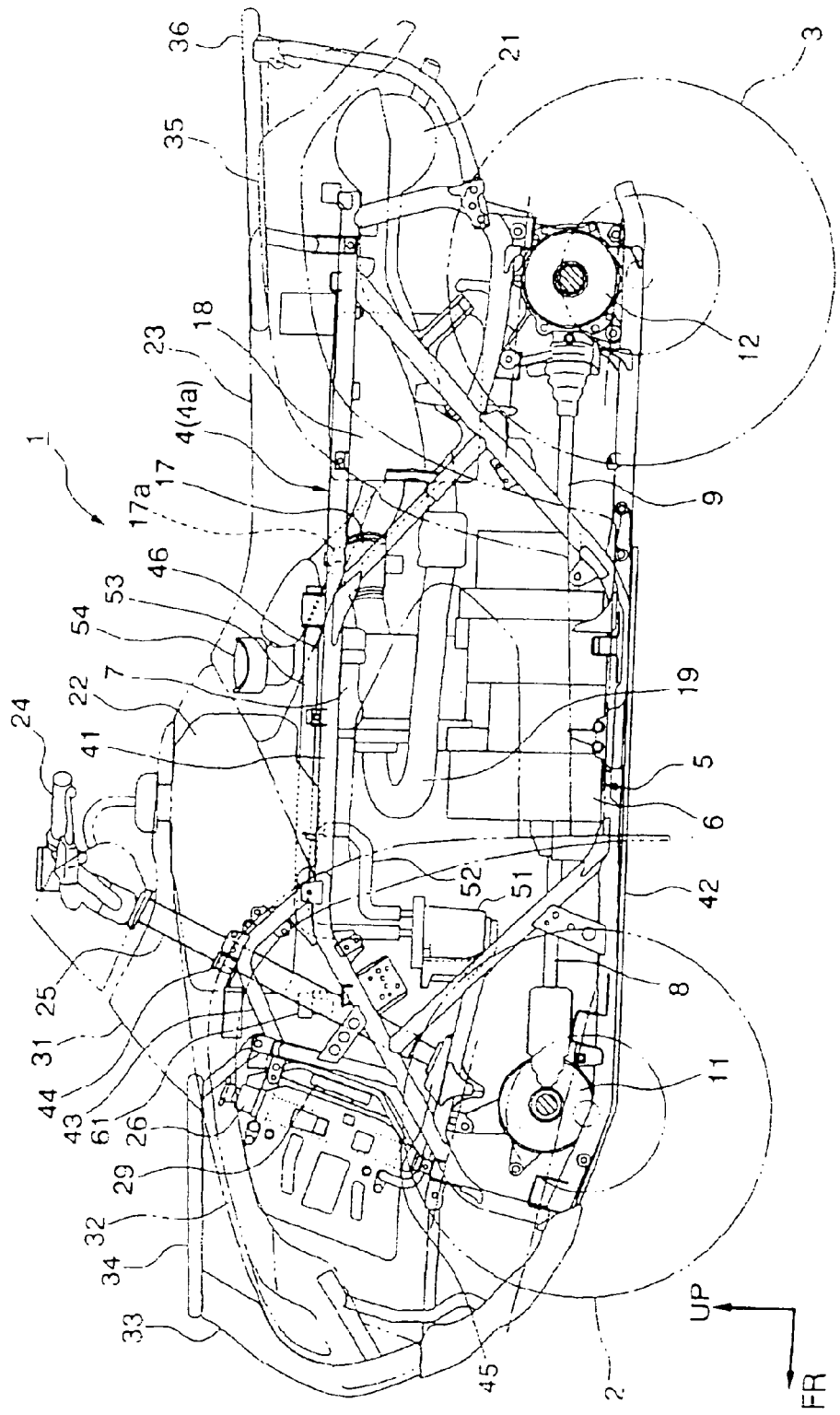
FIG. 1 is a side view of a saddle-ride type four-wheeled vehicle of an embodiment according to the present invention.

A saddle-ride type four-wheeled vehicle (vehicle) 1 shown in FIG. 1 is a so-called ATV (All Terrain Vehicle) that: is equipped with a pair of right and left front wheels 2 and another pair of right and left rear wheels 3, those wheels being low pressure balloon tires of a relatively large diameter, in the front and rear of the vehicle body configured so as to be small and lightweight, respectively; secures a large minimum ground clearance, and thus has improved the running through performance mainly on a rough terrain.

An engine 5 as the prime mover of the saddle-ride type four-wheeled vehicle 1 is disposed at a position nearly in the center of a vehicle body frame 4. The engine 5: is a single cylinder engine of a water cooling type; and is disposed on a longitudinal layout so that a crank shaft is placed in the anteroposterior direction. A crank case 6 that composes the lower part of the engine 5 has also the function as a transmission case and propeller shafts 8 and 9 extend in the front and rear directions from the front and rear of the crank case 6, respectively.

The propeller shafts 8 and 9 are connected to the front wheels 2 and rear wheels 3 in a power-transmittable manner through a front wheel power mechanism 11 and a rear wheel power mechanism 12 at the front and rear of the vehicle body frame 4, respectively. The front wheels 2 and rear wheels 3 are suspended in the front and rear of the vehicle body frame 4 with suspension systems not shown in the figure, respectively.

The saddle-ride type four-wheeled vehicle 1 adopts an electronically controlled fuel injection system in the fuel feed system to the engine 5 and a throttle body 17 having an injector 17a is connected to the rear part of a cylinder 7 disposed on the crank case 6 of the engine 5. Further, an air cleaner box 18 located under the rear part of a seat 23 is connected to the rear part of the throttle body 17. Meanwhile, the base end of an exhaust pipe 19 is connected to the front part of the cylinder 7. The exhaust pipe 19 extends toward the front of the cylinder 7 and thereafter is bent backward, and the tip thereof is connected to a silencer 21 disposed at the rear part of the vehicle body.

In the center of the vehicle width above the body of the saddle-ride type four-wheeled vehicle 1 a steering shaft 25, a fuel tank 22, and a saddle-ride type seat 23 are disposed starting from the front. The bottom end of the steering shaft 25 is connected to a front wheel steering mechanism not shown in the figure and a bar-shaped handle 24 having right and left grips is attached to the top end of the steering shaft 25. The vicinity of a holder to fix the handle 24 to the steering shaft 25 is covered with a handle cover 24a made of resin. A radiator 26, having a motor-driven fan 29, to cool the engine 5 is disposed in front of the lower part of the steering shaft 25.

To the front part of the vehicle body frame 4, attached are: a vehicle body cover 31 made of resin that covers the front part of the vehicle body including the fuel tank 22) a front fender 32 made of resin that likewise covers the front wheels 2 from above to the rear side; and a front protector 33 and a front carrier 34 mainly made of steel pipes. Further, to the rear part of the vehicle body frame 4, attached are: a rear fender 35 made of resin that covers the rear wheels 3 from above to the front side; and a rear carrier 36 mainly made of a steel pipe.

Figure 2:
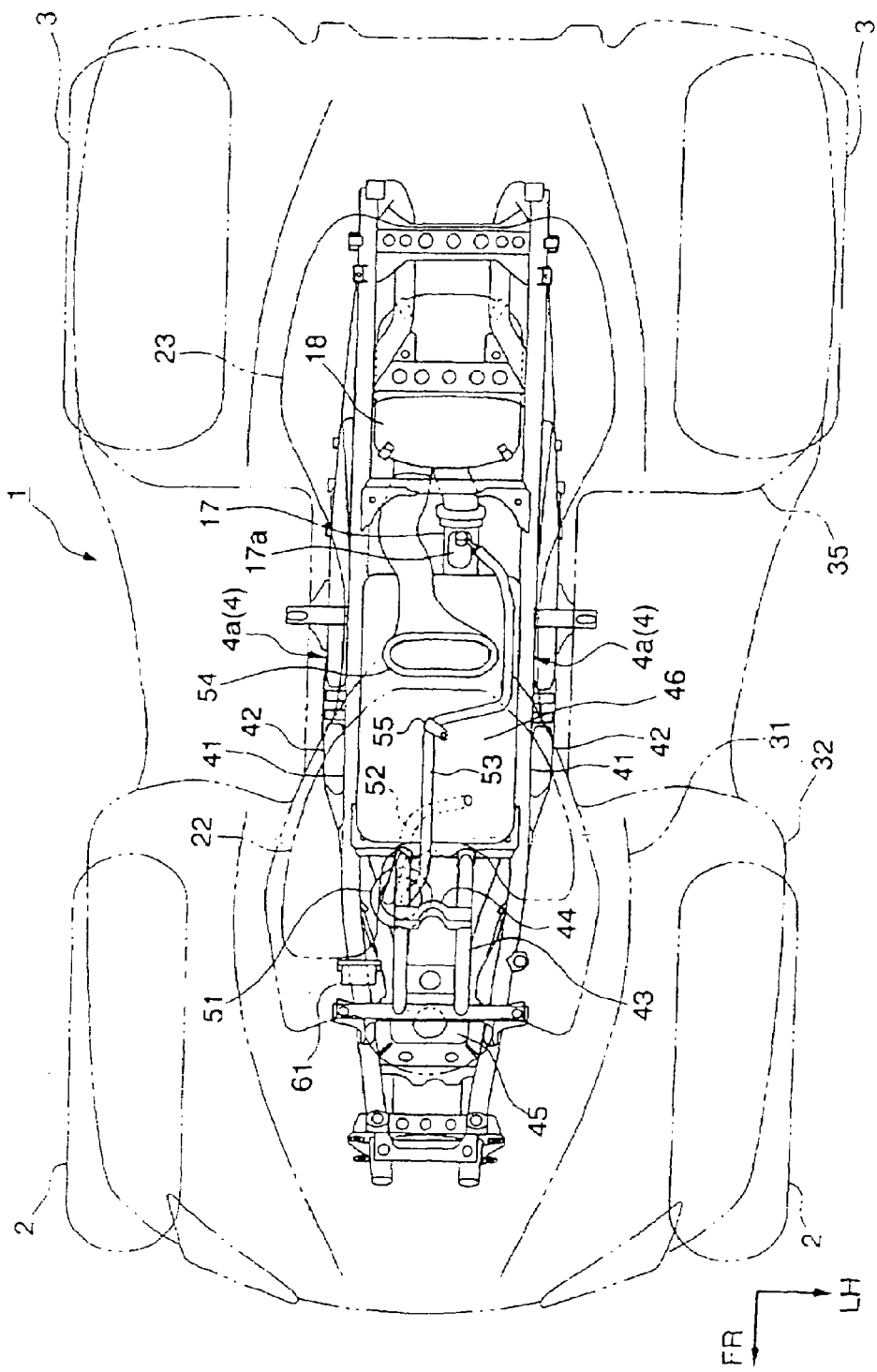
FIG. 2 is a top view of the aforementioned saddle-ride type four-wheeled vehicle.
Figure 3:
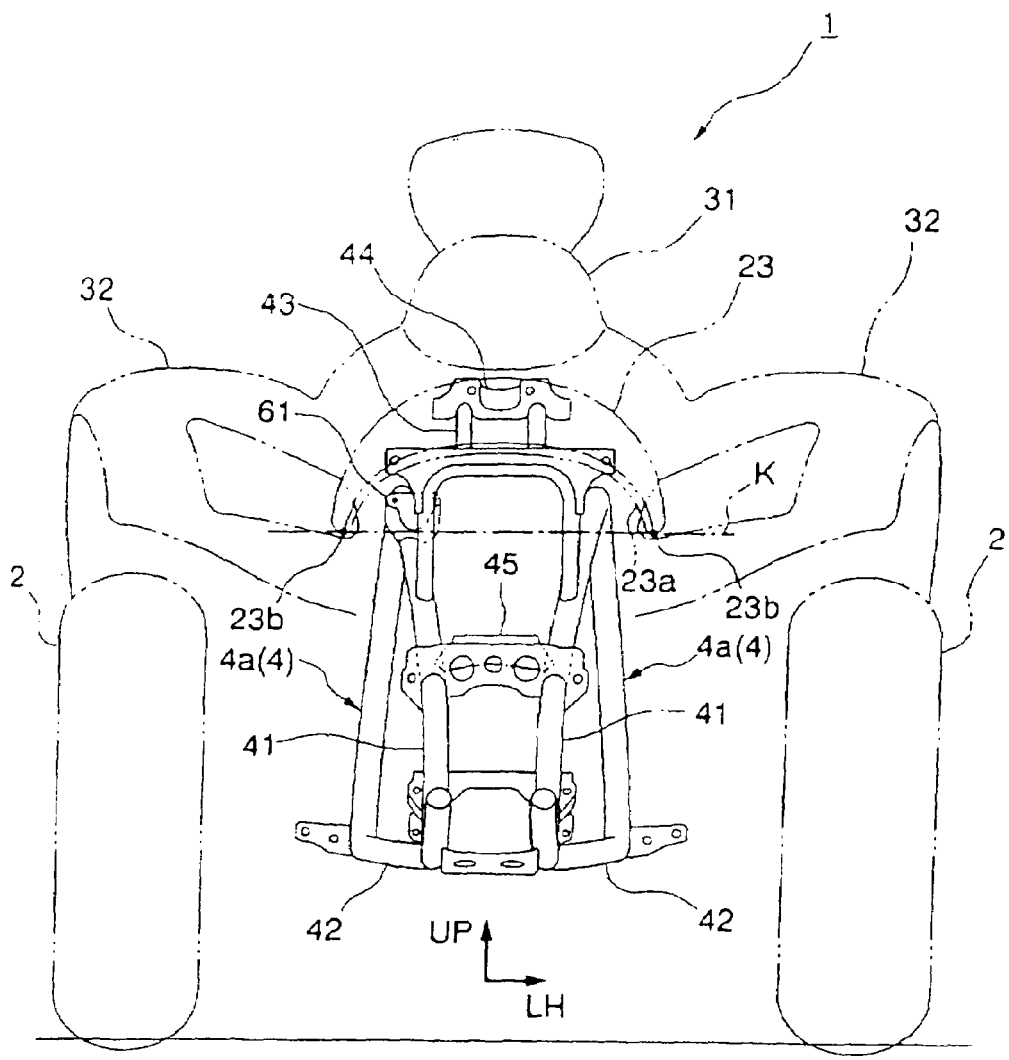
FIG. 3 is a front view of the aforementioned saddle-ride type four-wheeled vehicle.

The explanations are further given in reference to both FIGS. 2 and 3. The vehicle body frame 4 has a pair of an upper pipe 41 and a lower pipe 42, extending nearly in the anteroposterior directions at the upper and lower parts thereof respectively, on each of the right and left sides, a pair of right and left closed-loop structures 4a are formed by properly bending and jointing the upper pipes 41 and lower pipes 42 with each other at the front and rear of the vehicle body, and a box-shaped structure extending in the anteroposterior directions is formed in the center of the vehicle width by jointing both the closed-loop structures 4a with each other through plural cross members.

A derrick-shaped handle stem 43 protruding above the upper pipes 41 is disposed at the front part of the vehicle body and the tipper part of the steering shaft 25 is supported by an upper support bracket 44 that is a cross member at the top of the handle stem 43 (the uppermost part of the vehicle body frame 4). Further, the bottom end of the steering shaft 25 is supported by a lower support bracket 45 that is a cross member at the front part of the vehicle body frame 4.

Figure 4:
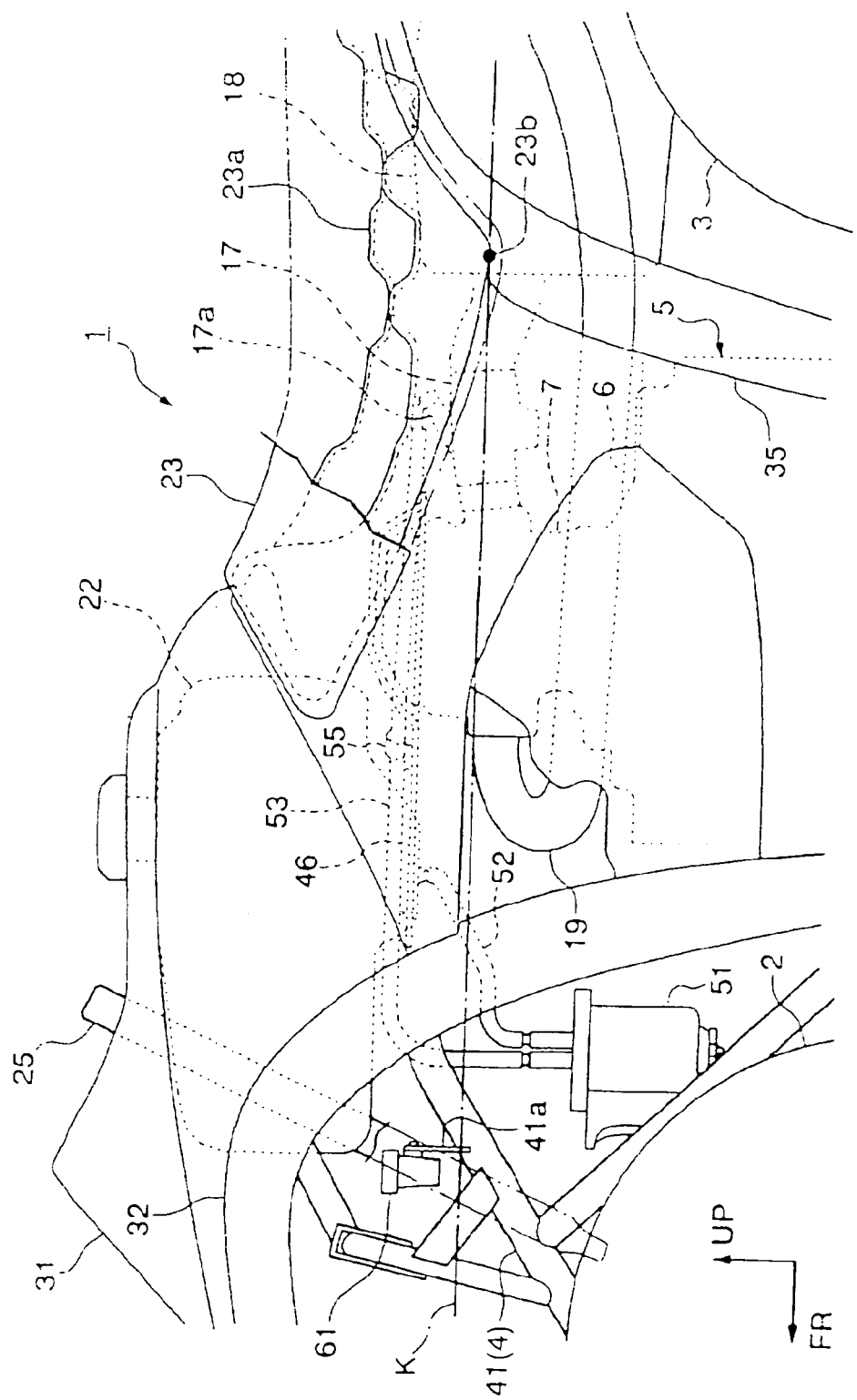
FIG. 4 is a side view showing a substantial part of FIG. 1.

Further, the explanations are given in reference to also FIG. 4. A heat shield cover 46 striding both the upper pipes 41 is disposed at the area extending from right under the rear part of the fuel tank 22 to right under the front part of the seat 23 and thus the propagation of hot air coming from the engine 5 located under the fuel tank 22 and the seat 23 is suppressed.

The fuel tank 22 is, for example, an integrally molded component made of resin and the capacity thereof is secured by extending both the sides of the front part forward so as to escape from the steering shaft 25 and others disposed immediately in front of the fuel tank 22. A fuel pump 51 is disposed under the front part of the fuel tank 22 and a fuel inlet at the upper part of the fuel pump 51 and a fuel outlet at the bottom of the fuel tank 22 are connected to each other through a connecting pipe 52.

Meanwhile, the fuel exhaust port of the fuel pump 51 and the injector 17a of the throttle body 17 are connected to each other through a fuel feed pipe 53. The fuel feed pipe 53: extends upward from the fuel exhaust port at the upper part of the fuel pump 51; bends rearward; then is routed along the upper face of the heat shield cover 46 between the fuel tank 22 and the heat shield cover 46; and reaches the injector 17a.

In this case, the fuel feed pipe 53 is routed so as to form a crank shape oil a top view in order to escape from a snorkel 54 extending forward and obliquely upward from the air cleaner box 18 and opening at the inside of the front end of the seat 23. Here, the reference numeral 55 in FIGS. 2 and 4 represents a cramp which is fixed to the heat shield cover 46 and stipulates the route of the fuel feed pipe 53.

Then, when the fuel pump 59 is activated, fuel sucked from the fuel tank 22 is pressurized up to a prescribed fuel pressure and thereafter fed to the injector 17a through the fuel feed pipe 53, and the fuel is properly ejected by the operation of the injector 17a and, together with external air introduced from the air cleaner box 18, supplied to the engine 5.

Here, a lean sensor 61 to detect the leaning of a vehicle body when it reaches a prescribed angle is disposed on the right side of the front part of the vehicle body. The lean sensor 61 is: supported by the vehicle body through a support bracket 41a fixed by welding to the upper pipe 41 on the right side; and disposed at a position above the bottom ends 23b (both the side parts of the seat 23 nearly in the center in the anteroposterior direction) of the baseplate 23a of the seat 23 (the level of the bottom ends 23b is shown by the line K in FIGS. 3 and 4) in a manner of overlapping with the steering shaft 25 on a side view.

Figure 5:
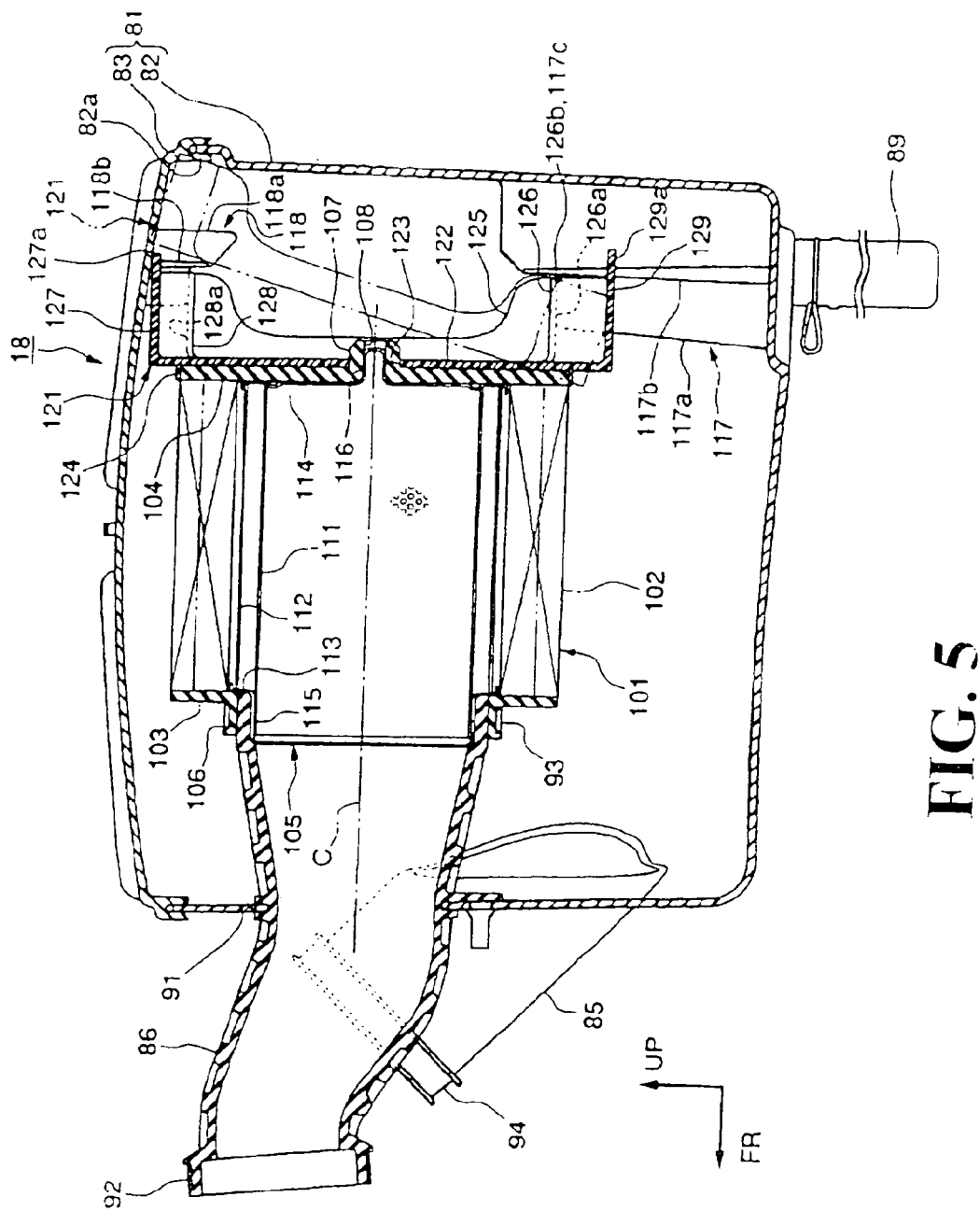
FIG. 5 is a side view of the air cleaner box of the aforementioned saddle-ride type four-wheeled vehicle.
Figure 6:
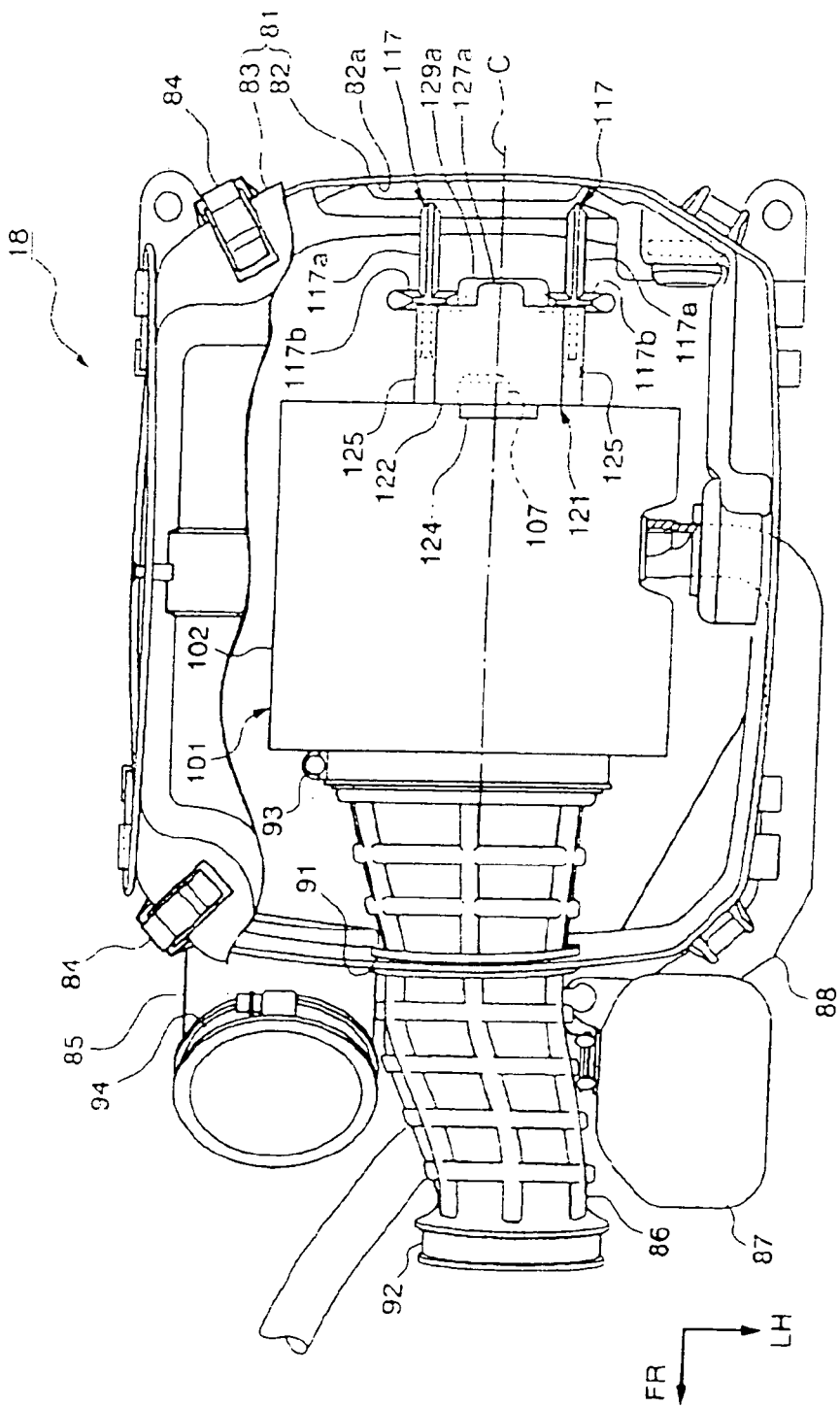
FIG. 6 is a top view of the aforementioned air cleaner box.

As shown in FIGS. 5 and 6, an air cleaner box 18 contains an air cleaner element 101 in a casing 81 thereof in an openable and closable manner.

The casing 81 comprises a box-shaped case body 82 opening upward and a case cover 83 that airtightly seals a case opening 82a of the case body 82. A fastener 84 comprising a C-shaped plate spring is disposed at each of the corners outside the case opening 82a of the case body 82 and the case cover 83 is attached to the case body 82 with the fasteners 84 in an openable and closable manner.

An intake duct 85 is attached to the front wall section on the right side of the casing 81 and a connecting tube 86 as a discharge duct is attached to the front wall section on the left side thereof. The case body 82 and the case cover 83 are made of, for example, synthetic resin such as PP or the like, and the intake duct 85 and the connecting tube 86 are made of, for example, rubber such as EPDM or the like. FIGS. 5 and 6 illustrate a resonator 87 for reducing Suction noise, a breather hose 88 extending from an engine, and a drain hose 89 for discharging oil and water in the casing 81, respectively.

The connecting tube 86 is attached to the opening of the front wall section by fitting an outer fitting groove 91 around the periphery of the intermediate portion thereof to the opening of the front wall section. The front end of the connecting tube 86 is fastened to the intake port of the throttle body 17 with a metal band 92 and the rear end thereof is fastened to the front end of the air cleaner element 101 with a metal band 93. Here, the front end of the intake duct 85 extending forward and obliquely upward from the front wall section of the casing 81 is fastened to the rear end of the snorkel 54 with a metal band 94.

The air cleaner element 101 has a closed-end cylindrical shape and is disposed somewhat closer to the upper side than the center portion in the casing 81 (closer to the case opening 82a) so that the axis line C thereof is in the anteroposterior direction and the opening side is the front side. By airtightly connecting the end of the opening side (front end) of the air cleaner element 101 to the rear end of the connecting tube 86, the sealing is secured at the opening side between the intake upstream side of the outside of the element and the intake downstream side of the inside of the element In the air cleaner box 18, ambient air is introduced toward the intake upstream side (outside of the element) in the casing 81 through the snorkel 54 and the intake duct 85 by the intake negative pressure generated in the engine 5. Then the ambient air is filtered through an element body 102 of the air cleaner element 101 when it flows toward the intake downstream side (inside of the element). The ambient air after filtered is, together with fuel ejected from the injector 17a, supplied to the engine 5 through the connecting tube 86, the throttle body 17 and others.

The air cleaner element 101 comprises: the element body 102 forming the periphery thereof; an annular front rubber plate 103 attached to the front end of the element body 102; a discoid rear rubber plate 104 attached to the rear end of the element body 102; and an element frame 105 disposed inside the above components.

The element body 102 is produced by forming, for example, urethane foam material into a cylindrical shape and has a two-layer structure comprising a fine mesh layer of the inner periphery and a relatively thin coarse mesh layer of the outer periphery.

The front rubber plate 103 is produced by: forming a rubber plate perpendicular to the axis line C into an annular shape having the axis line C in the center thereof; and forming a front flange section 106 protruding forward over the whole circumference of the inner rim thereof. The front rubber plate 103 thus produced touches and is welded to the front end of the element body 102.

The rear rubber plate 104 is produced by: forming a rubber plate perpendicular to the axis line C into a round shape having the axis line C in the center thereof; and forming an element rear protrusion 107 protruding rearward in the center thereof on the axis line C. A protrusion through-hole 108 in the C-axis direction is formed in the element rear protrusion 107. The rear rubber plate 104 thus produced touches and is welded to the rear end of the element body 102.

The element frame 105 comprises: inner and outer cylinders 111 and 112 forming the outer periphery thereof; an annular front, metal plate 113 disposed at the front ends of the inner and outer cylinders 111 and 112; and a discoid rear metal plate 114 disposed at the rear ends of the inner and outer cylinders 111 and 112.

The outer cylinder 111 is disposed immediately on the inner periphery side of the element body 102 and produced from, for example, a punching plate made of a steel sheet. The inner cylinder 112 disposed at an interval on the inner periphery side of the outer cylinder 111 is produced from, for example, a wire net of fine meshes. The outer and inner cylinders 111 and 112 function as a duplex flame trap to effectively prevent stains and damages of the element body 102 caused by flame from the engine 5 and the like.

The front metal plate 113 is produced by: forming a steel sheet perpendicular to the axis line C into an annular shape having the axis line C in the center thereof; and forming a front flange section 115 protruding forward over the whole circumference of the inner rim thereof. The front end of the inner cylinder 112 engages with the inner periphery of the front flange section 115 and a front flange section 106 of the front rubber plate 103 is disposed at a prescribed interval on the outer periphery side thereof.

The rear metal plate 114 is produced by: forming a steel sheet perpendicular to the axis line C into a round shape having the axis line C in the center thereof; and forming in the center thereof a frame rear protrusion 116 engaging with the protrusion through-hole 108 of the rear rubber plate 104 from the front side.

The rear ends of the inner and outer cylinders 111 and 112 touch the front face of the outer periphery of the rear metal plate 114 and the front ends of the inner and outer cylinders 111 and 112 touch the rear face of the front metal plate 113. Then, the inner and outer cylinders 111 and 112 and the metal plates 113 and 114 are joined in the above state by wielding or the like, and thereby the element frame 105 is integrally composed.

Then the element frame 105 is inserted into the space surrounded by the element body 102 and the rubber plates 103 and 104, the rear face of the rear metal plate 114 touches the front face of the rear rubber plate 104, the frame rear protrusion 116 engages with the protrusion through-hole 108, then, in the state, the above components are joined by bonding or the like, and thereby the air cleaner element 101 is integrally composed.

At the front end of the air cleaner element 101, the rear end of the connecting tube 86 is inserted between both the front flange sections 106 and 115 in an interposed manner, those components are tightened with the metal band 93 and thereby airtightly connected to each other, and the front end of the air cleaner element 101 is supported by the casing 81 through the connecting tube 86.

Then the rear end of the air cleaner element 101 is supported by the casing 81 through an element holder 121 made of synthetic resin such as PP or the like.

Figure 7:
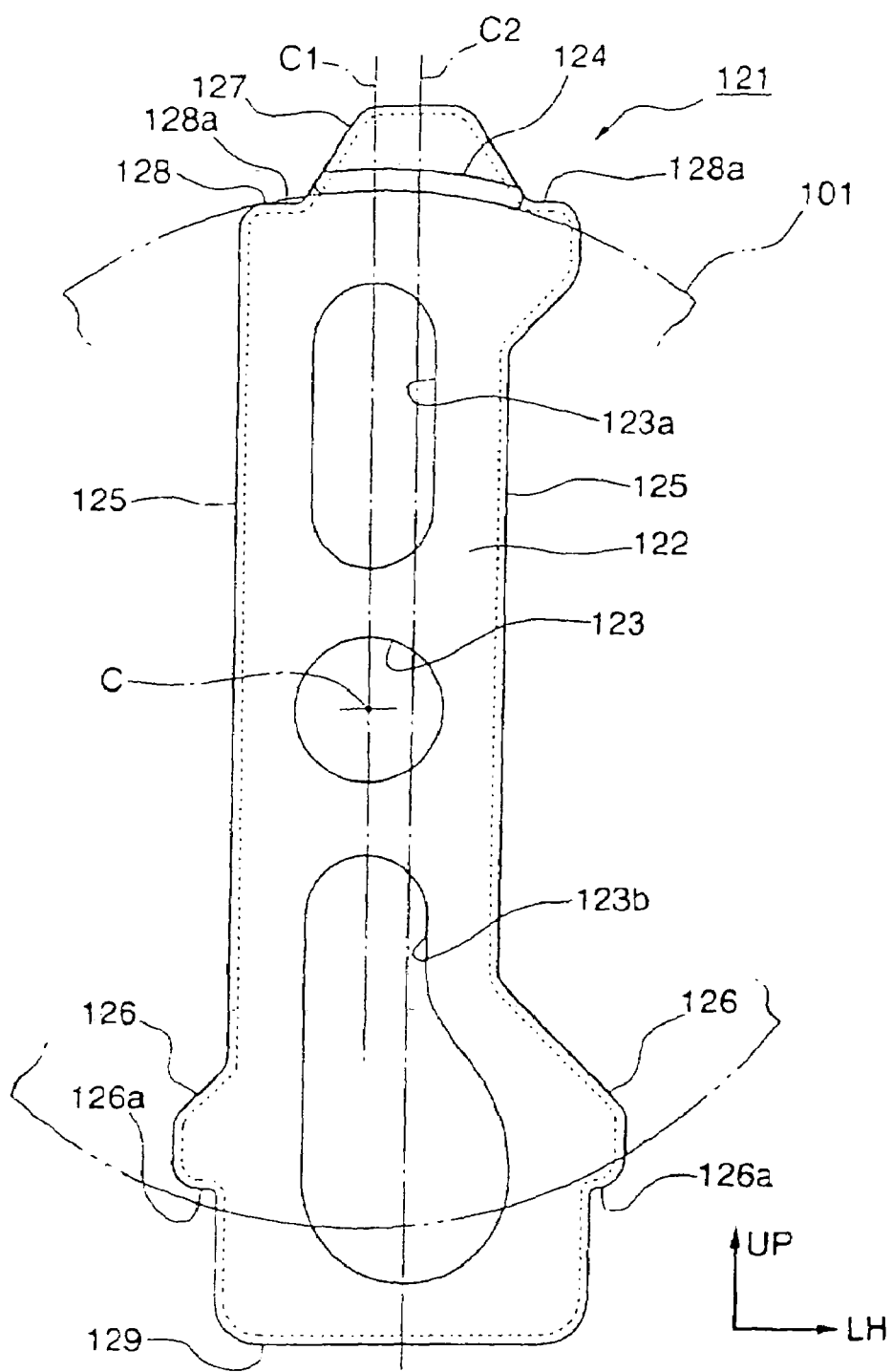
FIG. 7 is a front view of the element holder of the aforementioned air cleaner box.
Figure 8:
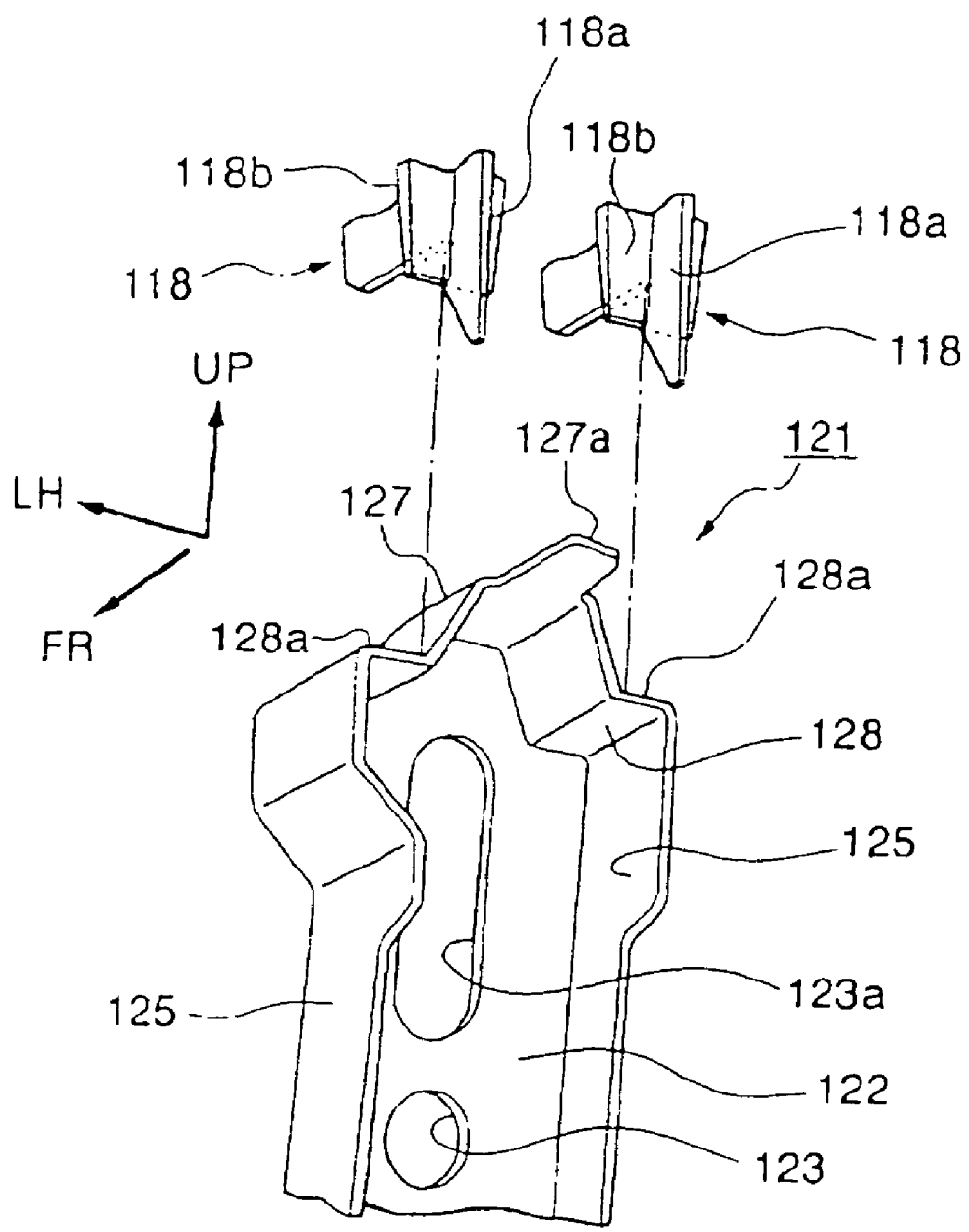
FIG. 8 is a perspective view of the upper part of the aforementioned element holder.
Figure 9:
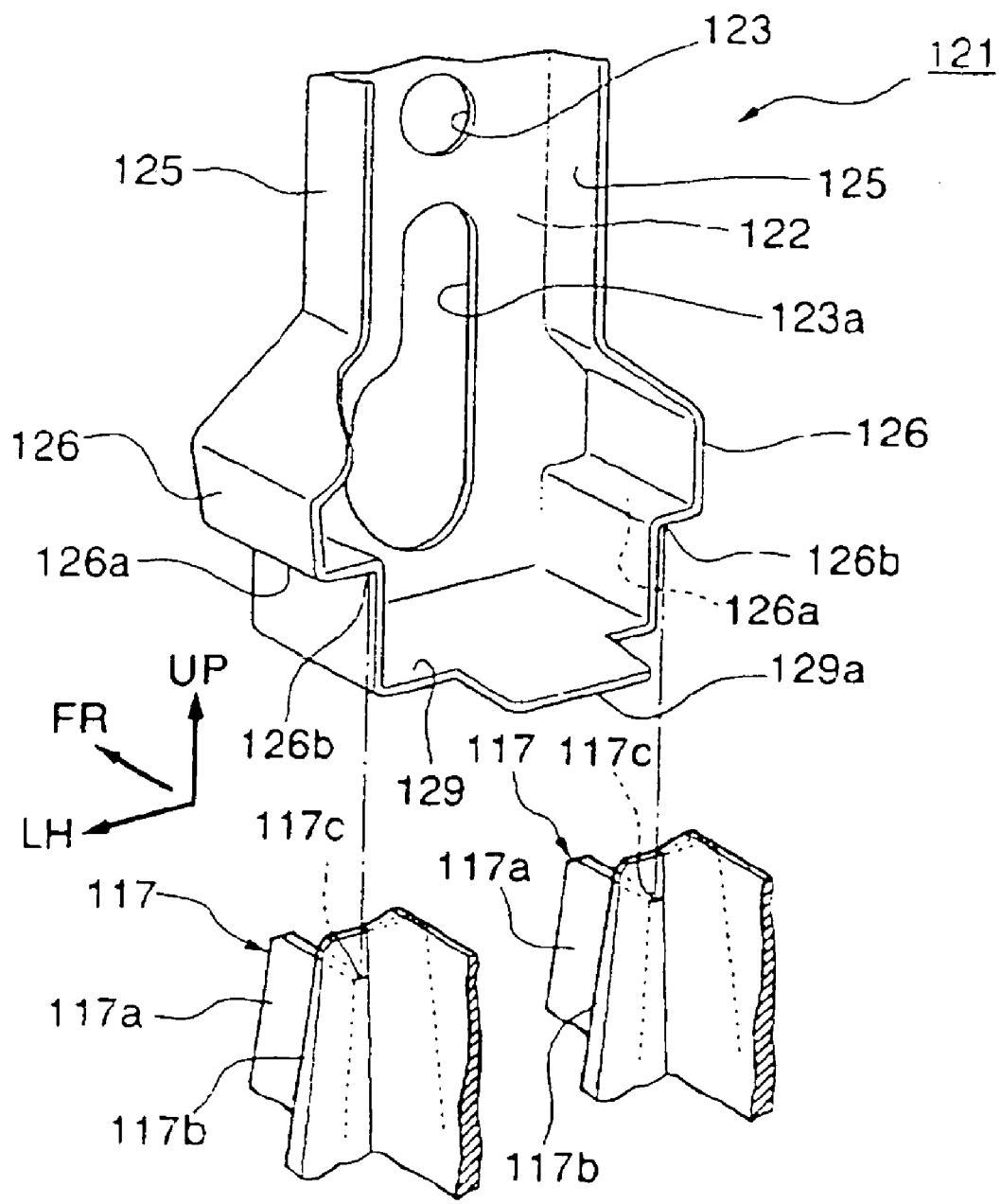
FIG. 9 is a perspective view of the lower part of the aforementioned element holder.
Figure 10:
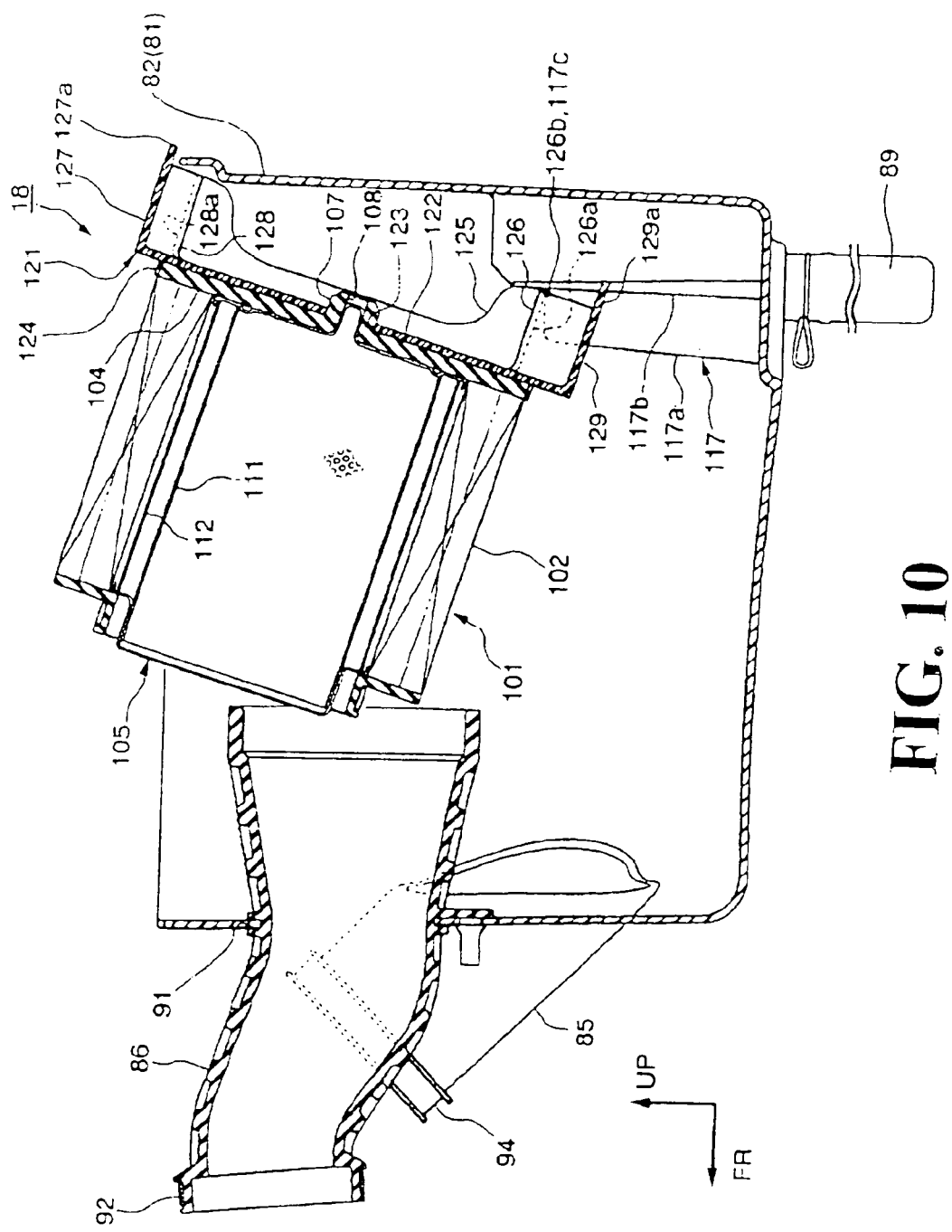
FIG. 10 is a side view showing the operation of the aforementioned element holder in the same way as FIG. 5.

Explanations are given in reference to FIGS. 7, 8, and 9 in combination. The element holder 121: extends in the vertical direction with a length exceeding the diameter of the air cleaner element 101 at a position immediately at the rear of the air cleaner element 101, and is formed into a box having a U-shape in cross section and opening rearward. Then, the bottom end of the element holder 121 is supported by case side rib sections 117 extending upward from the bottom wall portion of the casing 81 (case body 82) and the top end thereof is supported by cover side rib sections 118 extending downward from the top wall portion (case cover 83) of the casing 81. Here, in relation to disposing the air cleaner element 101 on the upper side in the casing 81, the length of the cover side rib sections 118 is designed so as to be shorter than the length of the case side rib sections 117.

A lock hole 123 to lock the element rear protrusion 107 of the air cleaner element 101 is disposed nearly in the center of the front wall portion 122 of the element holder 121 in the vertical direction, and a lock flange 124 to lock the upper edge of the rear end of the air cleaner element 101 (upper edge of the rear rubber plate 104) is disposed on the front side of the top end of the element holder 121. In the state of locking the air cleaner element 101 to the lock hole 123 and the lock flange 124, the front face of the element holder 121 touches and supports the rear face of the air cleaner element 101. The explanations are hereunder given while the position of the element holder 121 in the above case is regarded as the element support position.

Here, the element holder 121 is disposed on the position where the center line C1 of the width, extending in the lateral direction, of the front wall portion 122 having the lock hole 123 intersects with the axis-line C. Then, the center line C2 of the width of the whole element holder 121 in the lateral direction is offset to the left side of the center line C1 of the width in the lateral direction (refer to FIG. 7).

To be more precise, the width of the whole element holder 121 in the lateral direction is determined by the upper and lower parts thereof and they are disposed so as to extend to the left from the upper and lower parts of the front wall portion 122 on a front view. Thereby the center line C2 of the width of the whole element holder 121 in the lateral direction is offset to the left side of the center line C1 of the width of the front wall portion 122 in the lateral direction. Here, thinning holes 123a and 123b are formed above and below the lock hole 123 on the front wall portion 122 of the element holder 121, respectively.

Further, both sidewall portions 125 of the element holder 121 are cut so that the extension height from the front wall portion 122 is lowered except the upper and lower portions thereof. In other words, both the sidewall portions 125 are disposed so that the upper and lower portions thereof extend rearward. By so doing, the element holder 121 is formed as a member having a vertically extending U-shape on a side view.

Holder lower protrusions (one end section) 126 protruding outward in the lateral direction are disposed on both the sides of the lower part of the element holder 121 and nearly horizontal bottom faces 126a formed by both the holder lower protrusions 126 are used as the support faces supported by the case side rib sections 117. Further, a holder upper protrusion 127 having a chevron shape on a front view is extendedly disposed on the top end of the element holder 121 and nearly horizontal upper faces 128a of upper wall portions 128 of the element holder 121 remaining on both the sides of the base end of the holder upper protrusion 127 are used as the support faces supported by the cover side rib sections 118. Here, the lock flange 124 is disposed on the front side of the base end of the holder upper protrusion 127.

The rib sections 117 and 118 of the casing 81 comprise longitudinal ribs 117a and 118a extending in the anteroposterior direction and lateral ribs 117b and 118b intersecting with the longitudinal ribs at the intermediate portions thereof and extending in the lateral direction, and the cross-section thereof is a cross-like figure extending in the anteroposterior direction. The portions (anterior half portions), located in front of the lateral ribs 117b and 118b, of the longitudinal ribs 117a and 118a are cut so that the tips thereof are lowered on the side of the base ends. Then the upper faces 128a of the element holder 121 and the bottom faces 126a of the holder lower protrusions 126 are placed so as to touch the tips and the element holder 121 is caught from above and beneath and held in between.

In this case, the rear end of the top end of the element holder 121 and the rear ends of the holder lower protrusions 126 come close to the front faces of the lateral ribs 117b and 118b of the rib sections 117 and 118 respectively, and thereby the movement of the upper part and lower part of the element holder 121 in the rear direction is restricted. Here, the movement of the element holder 121 in the front direction is restricted since the front face thereof touches the rear face of the air cleaner element 101. Further, positioning flange sections 127a and 129a formed by extending rearward the parts of the holder upper protrusion 127 and the bottom wall section 129 of the element holder 121 are formed at the top and bottom ends of the element holder 121, respectively. Then the positioning flange sections 127a and 129a are interposed between both the lateral ribs 117b and 118b of the rib sections 117 and 118 respectively and thereby the upper and lower parts of the element holder 121 are positioned in the lateral direction.

The air cleaner box 18 of the present embodiment is configured as explained above. Then, the procedure when the air cleaner element 101 is attached to and detached from the casing 81 is explained hereunder.

Firstly, when the air cleaner element 101 is attached to the casing 81, the air cleaner element 101 is inserted into the case body 82 from which the case cover 83 is removed, the rear end of the connecting tube 86 is inserted into the front end thereof, and thereafter they are fastened with the metal band 93. In the state, the front end of the air cleaner element 101 is supported by the case body 82 through the connecting tube 86.

Thereafter, the element holder 121 is inserted toward the element support position in the case body 82 and, in the state of inclining so that the upper part thereof is located rearward, the bottom face rear ends (one end section) 126b of both the holder lower protrusions 126 are placed so as to touch the top ends of the front half portions of the longitudinal ribs 117a of the case side rib sections 117. The element holder 121 in this state is shown with the chain double-dashed line in FIG. 5.

In this case, the element holder 121 is in the state of inclining from the element support position while pivoting on the bottom face rear ends 126b of the holder lower protrusions 126 and also in the state of releasing the engagement of the lock hole 123 and the lock flange 124 with the air cleaner element 101.

Then, by swinging the element holder 121 from the aforementioned state so that the upper part thereof moves forward, the element holder 121 is placed at the element support position, the element rear protrusion 107 is engaged in the lock hole 123, the upper edge of the rear end of the air cleaner element 101 is engaged with the lock flange 124, and the rear face of the air cleaner element 101 touches the front-face of the element holder 121.

In the state, the case cover 83 is placed on the case body 82, the element holder 121 is cramped by the rib sections 117 and 118, and the case cover 83 is fixed to the case body 82 with the fasteners 84. Thereby, the rear end of the air cleaner element 101 is supported by the casing 81 through the element holder 121 and resultantly the attachment of the air cleaner element 101 to the casing 81 is finished.

On the other hand, when the air cleaner element 101 is detached from the casing 81, firstly the fasteners 84 are removed, the case cover 83 is removed from the case body 82, the element holder 121 is released from the support by the rib sections 117 and 118, and thereafter the element holder 121 is swung so that the upper part thereof moves rearward while pivoting on the bottom face rear ends 126a of both the holder lower protrusions 126 thereof. Thereby, the element holder 121 is retracted from the element support position and the engagement of the lock hole 123 and the lock flange 124 with the air cleaner element 101 is released.

After that the element holder 121 is pulled out from the case body 82, the connection between the front end of the air cleaner element 101 and the rear end of the connecting tube 86 is disconnected, the air cleaner element 101 is pulled out, separated from the connecting tube 86 and removed outside the case body 82, and thereby the removal of the air cleaner element 101 from the casing 81 is finished.

As explained above, the structure of the air cleaner box in the aforementioned embodiment is applied to the air cleaner box 18 configured by containing the air cleaner element 101 in the casing 81. The casing 81 includes the case body 82 and the openable and closable case cover 83. The air cleaner element 101 and the element holder 121 to support the air cleaner element 101 are contained in the casing 81. The element holder 121 has an extended U-shape in cross section; both the end sections thereof are supported by the case body 82 and the case cover 83 respectively; and the element holder 121 pivots on the bottom face rear ends 126b of the holder lower protrusions 126 in an inclinable manner.

In the configuration, by supporting both the end sections of the element holder 121 having an extended U-shape in cross section, it is possible to surely hold the air cleaner element 101 through the element holder 121 without extending or adding the rib sections 117 and 118 extending from the casing 81. In addition; at the time of the attaching or detaching operation thereof, it is possible to incline the element holder 121 and retract it from the element support position and hence to facilitate the attaching or detaching operation thereof while enhancing the support rigidity of the air cleaner element 101.

Further, in the aforementioned air cleaner box structure, the element holder 121 has the lock flange 124 to engage with the air cleaner element 101 and thereby it is possible to surely support the air cleaner element 101 with the element holder 121 while ensuring the relative positioning of the air cleaner element 101 and the element holder 121.

Furthermore, in the aforementioned air cleaner box structure, the element holder 121 is supported by the rib sections 117 and 118 extending from the case body 82 and the case cover 83. Thus, it is possible to reduce the extension length of each rib section in comparison with the case of directly supporting the air cleaner element 101 with the rib sections 117 and 118.

In addition, in the aforementioned air cleaner box structure, the rib sections 117 and 118 are formed by intersecting the longitudinal ribs 117a and 118a with the lateral ribs 117b and 118b in a cross shape. As a result, it is possible to stably support the element holder 121 with a simple structure.

Moreover, in the aforementioned air cleaner box structure, the intersections 117c of the ribs 117a and 117b of the case side rib sections 117 function as the pivot of the inclination of the element holder 121 and thereby it is possible: to properly notch the ribs 117a and 117b intersecting with each other in cross shape and engage the ribs with one end section of the element holder 121; and thus to easily form the inclination pivot of the element holder 121 without using a specific structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure of an air cleaner box configured by containing an air cleaner element in a casing, wherein said casing comprises:
   a case body and an openable and closable case cover;
   said air cleaner element and an element holder to support said air cleaner element are contained in said casing;
   wherein said element holder has an extended U-shape in cross section; said element holder having end sections thereof supported by said case body and said case cover respectively; and
   wherein said element holder pivots on one of the end sections in an inclinable manner,
   wherein said element holder is supported by rib sections extending from said case body and said case covers,
   wherein a bottom end of the element holder is supported by the rib sections extending from the case body, and a top end of the element holder is supported by the rib sections extending from the case cover,
   wherein the rib sections extending from the case body extend upward from a bottom wall portion of the case body, and the rib sections extending from the case cover extend downward from the case cover.

2. The structure of an air cleaner box according to claim 1, wherein said element holder has a lock flange to engage with said air cleaner element.

3. The structure of an air cleaner box according to claim 1, wherein each of said rib sections is formed by intersecting two sheets of ribs in a cross shape.

4. The structure of an air cleaner box according to claim 3, wherein the intersection of the ribs of each of said rib sections functions as a pivot of the inclination of said element holder.

5. The structure of an air cleaner box according to claim 2, wherein the lock flange locks an upper edge of a rear end of the air cleaner element.

6. The structure of an air cleaner box according to claim 1, wherein the element holder includes a lock hole to lock an element rear protrusion of the air cleaner element, the lock hole being disposed nearly in a center of a front wall portion of the element holder in the vertical direction.

7. The structure of an air cleaner box according to claim 1, wherein the element holder extends in the vertical direction with a length exceeding a diameter of the air cleaner element at a position immediately at a rear of the air cleaner element.

8. The structure of an air cleaner box according to claim 1, wherein the rib sections are cross-shaped and extend toward each other, and
wherein the element holder is held between the rib sections.

9. The structure of an air cleaner box according to claim 1, wherein the air cleaner element has a closed-end cylindrical shape and is disposed somewhat closer to an upper side than a center portion in the casing.

10. A structure of an air cleaner box configured by containing an air cleaner element in a casing, wherein said casing comprises:
a case body and an openable and closable case cover;
said air cleaner element and an element holder to support said air cleaner element are contained in said casing;
wherein said element holder has an extended U-shape in cross section; said element holder having a lower and an upper end section thereof supported by said case body and said case cover respectively; and
wherein said element holder pivots about the lower end section for securing and releasing the air cleaner element,
wherein said element holder is supported by rib sections extending from said case body and said case cover,
wherein a bottom end of the element holder is supported by the rib sections extending from the case body, and a top end of the element holder is supported by the rib sections extending from the case cover,
wherein the rib sections extending from the case body extend upward from a bottom wall portion of the case body, and the rib sections extending from the case cover extend downward from the case cover.

11. The structure of an air cleaner box according to claim 10, wherein said element holder has a lock flange to engage with said air cleaner element.

12. The structure of an air cleaner box according to claim 10, wherein each of said rib sections is formed by intersecting two sheets of ribs in a cross shape.

13. The structure of an air cleaner box according to claim 12, wherein the intersection of the ribs of each of said rib sections functions as a pivot of the inclination of said element holder.

14. The structure of an air cleaner box according to claim 11, wherein the lock flange locks an upper edge of a rear end of the air cleaner element.

15. The structure of an air cleaner box according to claim 10, wherein the element holder includes a lock hole to lock an element rear protrusion of the air cleaner element, the lock hole being disposed nearly in a center of a front wall portion of the element holder in the vertical direction.

16. The structure of an air cleaner box according to claim 10, wherein the element holder extends in the vertical direction with a length exceeding a diameter of the air cleaner element at a position immediately at a rear of the air cleaner element.

17. The structure of an air cleaner box according to claim 10,
wherein the rib sections are cross-shaped and extend toward each other, and
wherein the element holder is held between the rib sections.

18. The structure of an air cleaner box according to claim 10, wherein the air cleaner element has a closed-end cylindrical shape and is disposed somewhat closer to an upper side than a center portion of the casing.

* * * * *